United States Patent
Haneda et al.

(10) Patent No.: US 6,189,027 B1
(45) Date of Patent: Feb. 13, 2001

(54) E-MAIL SENDING/RECEIVING SYSTEM, E-MAIL SENDING /RECEIVING METHOD AND RECORDING MEDIUM HAVING RECORDED THE METHOD

(75) Inventors: Isamu Haneda, Soraku-gun; Toshio Isoe, Tenri, both of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/104,169

(22) Filed: Jun. 25, 1998

(30) Foreign Application Priority Data

Sep. 24, 1997 (JP) .................................................. 9-258940

(51) Int. Cl.[7] .................................................. G06F 15/16
(52) U.S. Cl. ........................... 709/206; 709/207; 709/105
(58) Field of Search .................................... 709/206, 207, 709/205, 104, 105; 379/93.24; 711/111, 126, 146, 156, 133, 134, 135, 136, 170, 171; 707/9, 10, 204, 205; 345/330, 331, 332

(56) References Cited

U.S. PATENT DOCUMENTS

| | | |
|---|---|---|
| 5,487,100 | 1/1996 | Kane . |
| 5,493,692 | 2/1996 | Theimer et al. . |
| 5,617,541 * | 4/1997 | Albanese et al. ..................... 709/207 |
| 5,623,603 * | 4/1997 | Jiang et al. ........................... 709/207 |
| 5,623,641 * | 4/1997 | Kadoyashiki ........................ 711/171 |
| 5,627,764 * | 5/1997 | Schutzman et al. .................. 709/207 |
| 5,632,011 * | 5/1997 | Landfield et al. .................... 709/206 |
| 5,699,521 * | 12/1997 | Iizuka et al. ......................... 709/240 |
| 5,727,151 * | 3/1998 | Sugahara et al. ..................... 709/207 |
| 5,754,778 * | 5/1998 | Shoukima ............................ 709/206 |
| 5,796,633 * | 8/1998 | Burgess et al. ...................... 702/187 |
| 5,835,762 * | 11/1998 | Gans et al. ........................... 709/100 |
| 5,893,920 * | 4/1999 | Shaheen et al. ..................... 711/133 |
| 5,937,161 * | 8/1999 | Mulligan et al. ............... 340/825.44 |
| 6,023,712 * | 2/2000 | Spear et al. .......................... 707/205 |

FOREIGN PATENT DOCUMENTS

| | | |
|---|---|---|
| 0 491 367 A2 | 6/1992 | (EP) . |
| 63-256031 | 10/1988 | (JP) . |
| 02116242 | 4/1990 | (JP) . |
| 8-139747 | 5/1996 | (JP) . |
| 10065730 | 3/1998 | (JP) . |

* cited by examiner

Primary Examiner—Zarni Maung
Assistant Examiner—Jason D. Cardone
(74) Attorney, Agent, or Firm—Nixon & Vanderhye, P.C.

(57) ABSTRACT

An e-mail sending/receiving system is furnished with a host computer having a storage section for storing mails, a first control device for extracting the mails to be sent to a terminal in accordance with priorities assigned to the mails. Thus, the user can receive mails with higher priorities, such as urgent or important mails, in a secure manner without worrying about an available memory capacity of the terminal.

50 Claims, 6 Drawing Sheets

E-MAIL SENDING/RECEIVING SYSTEM, E-MAIL SENDING /RECEIVING METHOD AND RECORDING MEDIUM HAVING RECORDED THE METHOD

FIELD OF THE INVENTION

The present invention relates to a network system composed of a host computer and terminals connected to the host computer via communication lines, such as telephone lines and radio signals, and more particularly, to an e-mail sending/receiving system and an e-mail sending/receiving method for allowing the host computer and terminals to send/receive e-mails mutually, and to a recording medium having thereon recorded the above method.

BACKGROUND OF THE INVENTION

A system, in which tomorrow morning's papers are downloaded from a host computer to a terminal at a set time (in the night), so that the user can read the morning papers when he gets up, is conventionally available as an example network system composed of the host computer and terminals connected to the host computer via communication lines, such as telephone lines and radio signals. According to this system, the user can receive the data he wishes to see from the host computer automatically at night by avoiding the use in a daytime when the communication lines are much busier.

Japanese Laid-open Patent Application No. 139747/1996 (Tokukaihei No. 8-139747) discloses an e-mail receiving system furnished with selection means for classifying received mails in accordance with keywords ranked according to importance and for selecting received mails in accordance with the keyword indexes. According to this system, urgent or important mails are selected with precedence to enable the user to check the contents thereof at his earliest convenience.

However, in any of the above systems, a relation between a memory capacity of each terminal and a total volume of mails (a total volume of incoming mails) from the host computer is not concerned particularly. Thus, when the latter is greater than the former, for example, the terminal can not receive all the mails from the host computer, and the user may not be able to receive urgent or important mails.

Thus, to receive urgent or important mails in a reliable manner, the user has to manage the terminal to always secure a memory capacity sufficient for a total volume of the coming mails. Thus, the conventional systems have a problem that the system management is very troublesome.

SUMMARY OF THE INVENTION

It is therefore an object of the present invention to provide an e-mail sending/receiving system and an e-mail sending/receiving method which enables the user of a terminal to receive urgent or important mails in a secure manner without managing an available memory capacity of the terminal even when a total volume of the incoming mail exceeds the available memory capacity, and a recording medium having thereon recorded the above method.

To fulfill the above and other objects, an e-mail sending/receiving system of the present invention is characterized by being furnished with a terminal and a host computer including:

a first storage section for storing a mail;

a first control section for extracting mails to be sent to the terminal in accordance with priorities assigned to the mails.

According to the above arrangement, when the terminal is connected to the host computer through a communication line, the host computer extracts the mails stored in the first storage section by means of the first control section in accordance with the priorities assigned to the mails, and sends the same to the terminal.

Accordingly, of all the mails stored in the first storage section of the host computer, the terminal stores the mails in order of descending priorities to the user.

Thus, even when the terminal does not have an available memory capacity sufficient to store all the coming mails, the user can receive the mails assigned with higher priorities only if the available memory capacity is large enough to store these mails with higher priorities. Consequently, the user does not have to manage the system each time the user receives the mail(s), thereby making the system management easier.

Moreover, the user of the terminal can read the mails in order of descending priorities only by reading the mails in order of storage. In other words, the user can read the mails assigned with higher priorities to the user, that is, urgent or important mails, with the precedence without searching such mails from all the received mails only by reading the mails in the terminal in order of storage.

There can be also provided an e-mail sending/receiving method suitably used for the above-arranged e-mail sending/receiving system and a recording medium having thereon recorded the method.

More specifically, to fulfill the above and other objects, an e-mail sending/receiving method of the present invention is characterized by being composed of:

a first step of extracting mails having been stored in a first storage section of a host computer in accordance with priorities assigned to the mails; and a second step of sending the mails extracted in the first step to a terminal.

Also, to fulfill the above and other objects, a recording medium of the present invention which can be read by a computer is characterized by having recorded thereon a program for letting the computer perform:

a first process of extracting mails stored in a first storage section of a host computer in accordance with priorities assigned to the mails; and a second process of sending the mails extracted in the first process to a terminal.

For a fuller understanding of the nature and advantages of the invention, reference should be made to the ensuing detailed description taken in conjunction with the accompanying drawings.

DESCRIPTION OF THE EMBODIMENTS

The following description will describe an example embodiment of the present invention.

Figure 1:
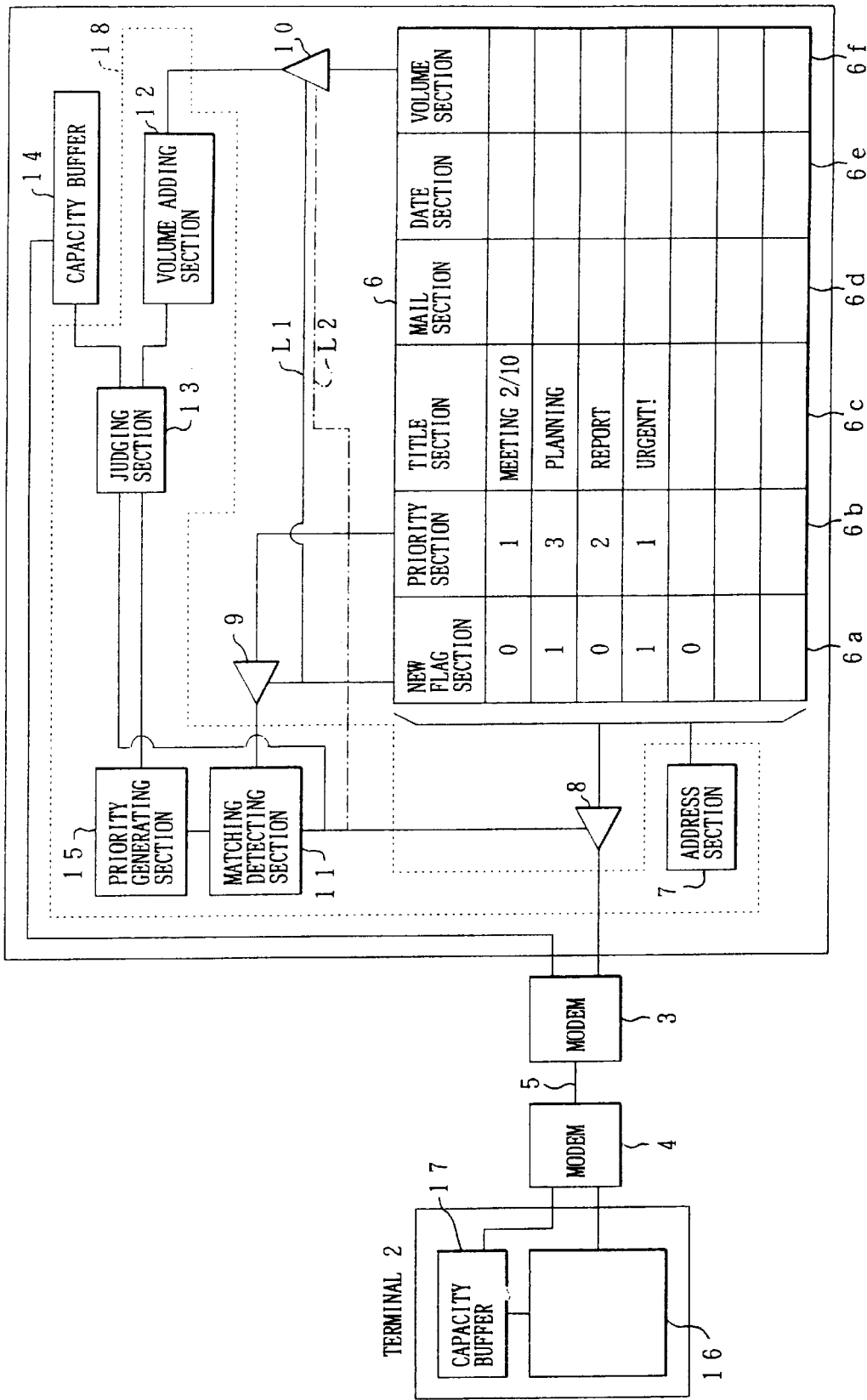
FIG. 1 is a view explaining in detail a host computer of an e-mail sending/receiving system in accordance with an example embodiment of the present invention.

As shown in FIG. 1, an e-mail sending/receiving system of the present embodiment is composed of a host computer 1 and a terminal 2, in which a first modem 3 of the host computer 1 is connected to a second modem 4 of the terminal 2 through a telephone line 5 serving as a communication line.

In other words, in the above-arranged e-mail sending/receiving system, the host computer 1 and terminal 2 send/receive the data mutually through the first modem 3 and second modem 4 via the telephone line 5.

The e-mail sending/receiving system of the present embodiment will be explained using an e-mail (hereinafter, referred to simply as a mail) as example data sent/received between the host computer 1 and terminal 2. Here, when the user writes a mail, the user assigns the priority to the mail in accordance with the precedence or importance of the mail.

The host computer 1 does not send all the mails indiscriminately to the terminal 2.

To be more specific, the host computer 1 obtains an available memory capacity of the terminal 2 when connected to the same, and compares a total volume of the mails to be sent to the terminal 2 with the available memory capacity, and judges whether the terminal 2 can store all of these mails.

When the host computer 1 judges that the former is greater than the latter, the host computer 1 sends the mails in order of descending priorities. When the host computer 1 judges that the former is smaller than the latter, the host computer 1 simply sends all the mails to the terminal 2.

A detailed explanation of the host computer 1 will be given in the following.

As shown in FIG. 1, the host computer 1 is furnished with a storage section (first storage section) 6 as storage means for retaining mails addressed to each user. In the drawing, only one user is illustrated for the explanation's convenience.

The storage section 6 is composed of a new flag section 6a, a priority section 6b, a title section 6c, a mail section 6d, a date section 6e, and a volume section 6f for storing mail information appended to each mail, such as the title and date. An address is allocated to each mail, so that the mails are managed by and retrieved based on their respective addresses.

In the new flag section 6a, a new flag is set to indicate whether the user has confirmed the mail or not. More specifically, in the new flag section 6a, a value "1" is set for a new mail which the user has not read yet, and a value "0" is set for a mail which the user has already read.

In the priority section 6b, the precedence found from the priority assigned to each mail is set. More specifically, values "1", "2", "3" and "0" are set in order of descending priorities based on the precedence. In FIG. 1, however, the lowest priority indicated by "0" is assigned to no mail. Note that the priority assigned to each mail is defined by the user in advance.

In the title section 6c, the title of the mail is stored and a brief content of the mail is stored in the mail section 6d. In the date section 6e, the receipt date of the mail is stored, and a value representing a volume of the mail is stored in the volume section 6f.

The entire mail and other mail information are stored in an unillustrated storage area of the storage section 6.

The storage section 6 is connected to a control device (first control means) 18 through a first gate 8, a second gate 9, and a third gate 10. The storage section 6 is also connected to an address section 7 that forms the control device 18.

The control device 18 is composed of the address section 7, a matching detecting section 11, a volume adding section 12, a judging section 13, and a priority generating section 15.

The address section 7 sequentially retrieves the mails stored in the storage section 6 based on their respective addresses, and outputs the same to the first gate 8.

The output of the first gate 8 is connected to the first modem 3 of the host computer 1, so that the input mails are sent from the host computer 1 to the terminal 2 through the first modem 3 when the first gate 8 is opened. The first gate 8 is opened based on a gate opening command signal from either the matching detecting section 11 or judging section 13, which will be described below.

The input of the second gate 9 is connected to the priority section 6b of the storage section 6, while the output of the same is connected to the matching detecting section 11, which will be described below. The second gate 9 receives a new flag from the new flag section 6a of the storage section 6 as the gate opening command signal. In other words, the second gate 9 is opened based on the input new flag, so that a signal (indicating the priority of the mail) from the priority section 6b of the storage section 6 is outputted to the matching detecting section 11.

The input of the third gate 10 is connected to the volume section 6f of the storage section 6, while the output of the same is connected to the volume adding section 12, which will be described below. The third gate 10 receives a new flag from the new flag section 6a of the storage section 6 as the gate opening command signal. In other words, the third gate 10 is opened based on the input new flag, so that a signal (indicating a volume of the mail) from the volume section 6f of the storage section 6 is outputted to the volume adding section 12.

In the present embodiment, since "1" is set for a new mail and "0" is set for the other mails in the new flag section 6a, the second gate 9 and third gate 10 are opened upon receipt of a new flag exhibiting "1" only.

The volume adding section 12 adds up volumes of the new mails inputted through the third gate 10 each time all the mails are retrieved, and outputs the addition result of the volume values to the judging section 13 which is connected to the output of the volume adding section 12. Here, the addition result can be a total volume of all the new mails to be sent to the terminal 2.

The judging section 13 is connected to a capacity buffer 14 which stores an available memory capacity of the terminal 2, and it compares the available memory capacity of the terminal 2 with the addition result from the volume adding section 12, which is in effect a total volume of the mails to be sent to the terminal 2.

The judgment result of the judging section 13 is outputted to both the first gate 8 and priority generating section 15. More specifically, when the available memory capacity of the terminal 2 is greater than the addition result, the judging section 13 outputs the gate opening command signal to the first gate 8; otherwise the judging section 13 outputs a signal to the priority generating section 15.

The priority generating section 15 generates the priorities based on the signal from the judging section 13, so that the mails are sent in order of descending priorities, and outputs the priority information to the matching detecting section 11. For example, in the example case of FIG. 1, a value "1" is outputted first followed by values "2", "3", and "0".

The matching detecting section 11 outputs the gate opening command signal to the first gate 8 only when the priority of the mail, for which the new flag inputted through the second gate 9 exhibits "1", matches with the priority generated by the priority generating section 15. More specifically, if the priority generated by the priority generating section 15 is "1", the first gate 8 is opened to output only the mails with their priority sections 6b of the storage sections 6 being set to "1" to the terminal 2 through the first modem 3.

In other words, in the example case of FIG. 1, the first gate 8 is opened, so that, of all the mails stored in the storage section 6, only the mail for which the new flag exhibits "1" and the priority also exhibits "1", that is, the mail titled as "URGENT!", is outputted to the terminal 2 through the first modem 3.

When the first gate 8 is opened, the mail stored in the storage section 6 is sent through the first modem 3 via the telephone line 5 and received by the terminal 2 through the second modem 4.

The terminal 2 is furnished with a storage section (second storage section) 16 serving as storage means for storing the mails sent from the host computer 1. The storage section 16 receives and stores the mails sent from the host computer 1 through the second modem 4.

The storage section 16 is connected to a capacity buffer 17 for storing a balance between the memory capacity of the storage section 16 and a total volume of the currently stored mails as the available memory capacity information. The capacity buffer 17 is connected to the second modem 4, so that it sends the stored available memory capacity information to the capacity buffer 14 provided in the host computer 1.

Next, the operation of the above-arranged host computer 1 when sending an unread new mail to the terminal 2 will be explained in the following.

The address section 7 accesses the mails stored in the storage section 6 of the host computer 1 sequentially. When the address section 7 accesses a mail for which the new flag section 6a is set to "1", the new flag section 6a outputs the gate opening command signal to both the second gate 9 and third gate 10, whereby the second gate 9 and third gate 10 are opened.

The second gate 9 receives the priorities of the mails stored in the priority section 6b, and is opened by the signal from the new flag section 6a only when the new flags exhibit "1", so that only the priorities of the mails for which the new flags are set to "1" are outputted to the matching detecting section 11.

On the other hand, the third gate 10 receives a volume of the mail being accessed by the address section 7 from the volume section 6f. Thus, as the third gate 10 is opened for the mail for which the new flag exhibits "1", only a volume of the mail for which the new flag also exhibits "1" is outputted to the volume adding section 12.

The volume adding section 12 adds up the volumes of the mails inputted through the third gate 10 and outputs the addition result to the judging section 13 as a total volume of the mails to be sent to the terminal 2.

The judging section 13 compares the content of the capacity buffer 14 storing an available memory capacity of the terminal 2 with a total volume (sending volume) of the mails to be sent to the terminal 2 obtained by the volume adding section 12. When the former is greater than the latter, the judging section 13 outputs the gate opening command signal directly to the first gate 8, whereupon the first gate 8 is opened. Thus, under these conditions, when the address section 7 accesses the mails in the storage section 6 again, all the mails for which the new flag sections 6a exhibit "1" are sent to the terminal 2.

On the other hand, when the judging section 13 judges that the former is smaller than the latter, the judging section 13 outputs a signal to the priority generating section 15 without directly opening the first gate 8.

The priority generating section 15 generates the priorities to send the mails in order of descending priorities, and outputs the resulting information to the matching detecting section 11.

As has been explained, the matching detecting section 11 receives the priority stored in the priority section 6b of each mail for which the new flag is set to "1". Then, the matching detecting section 11 judges whether the priority of each input mail matches with the priority generated by the priority generating section 15. The matching detecting section 11 outputs the gate opening command signal to the first gate 8 to open the same only when it judges the matching of the priorities.

Thus, according to the above-arranged e-mail sending/receiving system, the host computer 1 compares a volume of the mails stored therein with an available memory capacity of the terminal 2 first, and when the former is greater than the latter, the host computer 1 sends the mails to the terminal 2 in order of descending priorities assigned to the mails.

Figure 2:
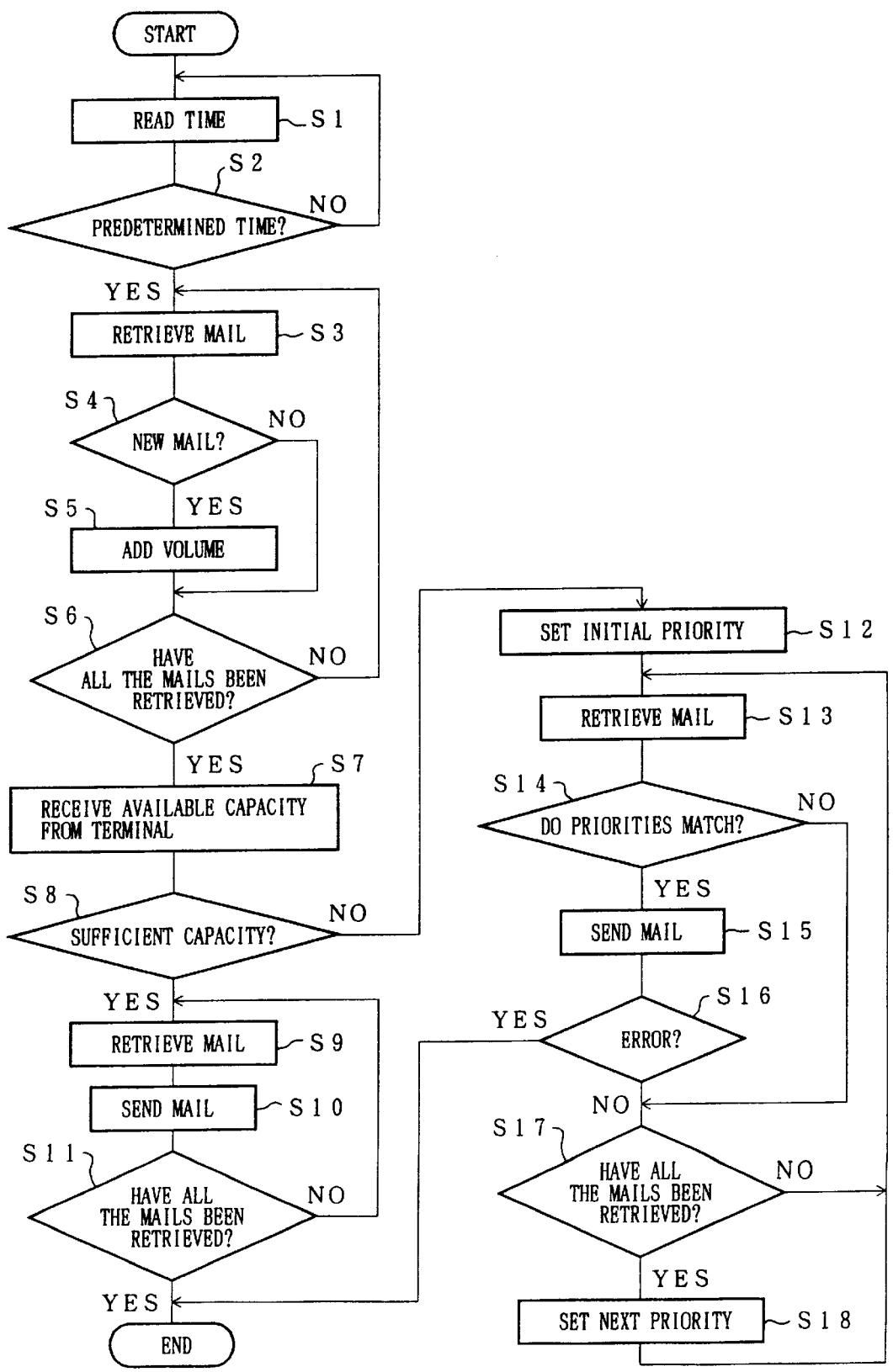
FIG. 2 is a flowchart detailing an operation procedure in the e-mail sending/receiving system of FIG. 1.

Next, the procedure of the sending/receiving job in the above-arranged e-mail sending/receiving system will be explained in detail with reference to the block diagram of FIG. 1 and the flowchart of FIG. 2. Here, radio signals, such as those used for a portable telephone, are used as the communication line instead of the telephone line 5 of FIG. 1.

To begin with, current time information is obtained from a clock (not shown) installed in the host computer 1 (S1).

Then, whether the read time information is a predetermined time (e.g., 10:00 AM or 3:00 PM) or not is judged (S2). When the read time information matches with the predetermined time (YES), the host computer 1 establishes a connection with the terminal 2 through radio signals, and the flow proceeds to S3.

In S3, the host computer 1 retrieves a mail stored in the storage section 6 and judges whether its new flag exhibits "1" or not by means of the address section 7, based on which whether the mail is an unread new mail or not is judged (S4)

If the mail retrieved by the address section 7 is a new mail, the third gate 10 is opened because its new flag is set to "1". Accordingly, a volume of the mail is inputted to the volume adding section 12 from the volume section 6f through the third gate 10. Subsequently, the volume adding section 12 adds the volume of the input mail to a sending volume as a volume of the mails to be sent (S5).

On the other hand, when it is judged that the mail retrieved by the address section 7 is not a new mail in S4 (NO), the flow skips to S6.

In S6, whether all the mails stored in the storage section 6 have been retrieved or not is judged. When not all the mails have been retrieved (NO), the flow returns to S3 and the remaining mails in the storage section 6 are retrieved.

On the other hand, when it is judged that all the mails have been retrieved in S6 (YES), the host computer 1 receives an available memory capacity of the storage section 16 of the terminal 2 from the capacity buffer 17 of the terminal 2, and stores the same in the capacity buffer 14 (S7).

Then, the judging section 13 of the host computer 1 compares the available memory capacity of the storage section 16 of the terminal 2 stored in the capacity buffer 14 with the sending volume computed by the volume adding section 12. By so doing, the judging section 13 judges whether the available memory capacity of the storage section 16 of the terminal 2 is greater than the sending volume of all the new mails, in other words, the judging section 13 judges whether there is a receiving capacity in the terminal 2 (S8).

When the judging section 13 judges that there is a receiving memory capacity in the terminal 2 in S8 (YES), all the mails to be sent to the terminal 2 from the host computer 1 are judged as being storable in the terminal 2. Accordingly, the judging section 13 directly outputs the gate opening command signal to the first gate 8, so that the first gate 8 is opened for all the new mails. Under these conditions, the host computer 1 retrieves a new mail (S9) and sends the same to the terminal 2 (S10).

Then, the host computer 1 judges whether it has retrieved and sent all the new mails to the terminal 2 (S11). When the host computer 1 judges so (YES), it ends the job; otherwise (NO) the flow returns to S9 and the remaining mails are retrieved.

Like in the above case, when the terminal 2 can store all the mails to be sent from the host computer 1, namely, all the new mails, the host computer 1 sends all the new mails to the terminal 2.

On the other hand, when the judging section 13 judges that there is not a sufficient receiving memory capacity in the terminal 2 in S8 (NO), the host computer 1 operates in the following manner. That is, when a receiving capacity of the terminal 2 is short, not all the new mails can be sent to the terminal 2 from the host computer 1. Thus, of all the priorities assigned to the new mails, a value indicating the top priority (indicated by a value "1" in FIG. 1) is set as an initial value in the matching detecting section 11 (S12).

Here, the judging section 13 outputs the judgement result to the priority generating section 15 in the form of a signal. The priority generating section 15 generates a value indicating the top priority based on the signal from the judging section 13, outputs the same to the matching detecting section 11 as an initial value used to verify the matching of the priorities. Then, the matching detecting section 11 sets the input value from the priority generating section 15 as a priority for detecting the matching of the priorities (S12). In the example case of FIG. 1, a value "1" indicating the top priority is assigned to the mails first followed by values "2", "3", and "0". Therefore, the priority generating section 15 generates a value "1" as the initial priority value and sets the same to the matching detecting section 11.

Then, the address section 7 retrieves a new mail stored in the storage section 6 of the host computer 1 (S13).

Accordingly, the matching detecting section 11 judges whether the priority of the retrieved new mail matches with the priority set in the priority generating section 15 (S14). When the two priorities do not match with each other (NO), the flow skips to S17; otherwise (YES) the host computer 1 sends the new mail to the terminal 2 (S15). At this point, the matching detecting section 11 outputs the gate opening command signal to the first gate 8, so that the first gate 8 is opened for the above new mail.

Then, whether the mail thus sent causes an error or not is judged (Sl6). In other words, whether the mail sent in S15 causes an overflow in the storage section 16 of the terminal 2 is judged. Here, if the occurrence of an overflow in the terminal 2 is detected (YES), the host computer 1 judges that the mails have been sent to the terminal 2 to a full memory capacity of the storage section 16 and ends the job; otherwise (NO) the flow proceeds to S17, because the host computer 1 judges that the storage section 16 of the terminal 2 has an available memory capacity for more mails.

In S17, whether all the mails stored in the host computer 1 have been retrieved or not is judged. When all the new mails have been retrieved (YES), the next priority is set (S18). Then, the flow returns to S13, where the sending of the new mails in accordance with the new priority is determined. In other words, the priority generating section 15 generates the next highest priority to the one currently set in the matching detecting section 11, and sets the same in the matching detecting section 11. On the other hand, when not all the new mails have been retrieved (NO), the flow returns to S13 and a mail having the same priority as the currently set priority is sent.

In other words, in the example case of FIG. 1, each time the priority generating section 15 generates the priorities, indicated by the initial value "1" followed by values "2", "3", and "0", processes of retrieving a new mail, detecting the matching of the priorities by the matching detecting section 11, and sending of the mail are repeated.

Here, S12–S18 are the actions taken by host computer's first internal control means and host computer's sixth internal control means; S4 and S14 are the actions taken by host computer's second internal control means; and S3–S16 are the actions taken by host computer's third internal control means.

In the above e-mail sending/receiving system, the host computer 1 selectively sends the mails based on an available memory capacity of the storage section 16 of the terminal 2. However, in another example e-mail sending/receiving system described below, an available memory capacity of the storage section 16 is adjusted in accordance with a volume of the mails to be sent to the terminal 2, so that the terminal 2 can receive all the new mails.

More specifically, in the e-mail sending/receiving system described below, the terminal 2 does not receive all the mails indiscriminately, but judges whether it has a sufficient available memory capacity to receive all the mails. When the terminal 2 judges that its available memory capacity is smaller than a total volume of the mails to be sent from the host computer 1, the terminal 2 saves the mails having stored in its storage area to the host computer 1 so as to secure a memory capacity sufficient to receive all the new mails. Then, the terminal 2 stores the new mails sent from the host computer 1 to an area where the saved mails had been stored. Here, the terminal 2 creates a list of the saved mails.

In the following, a detailed explanation of the terminal 2 will be given.

Figure 3:
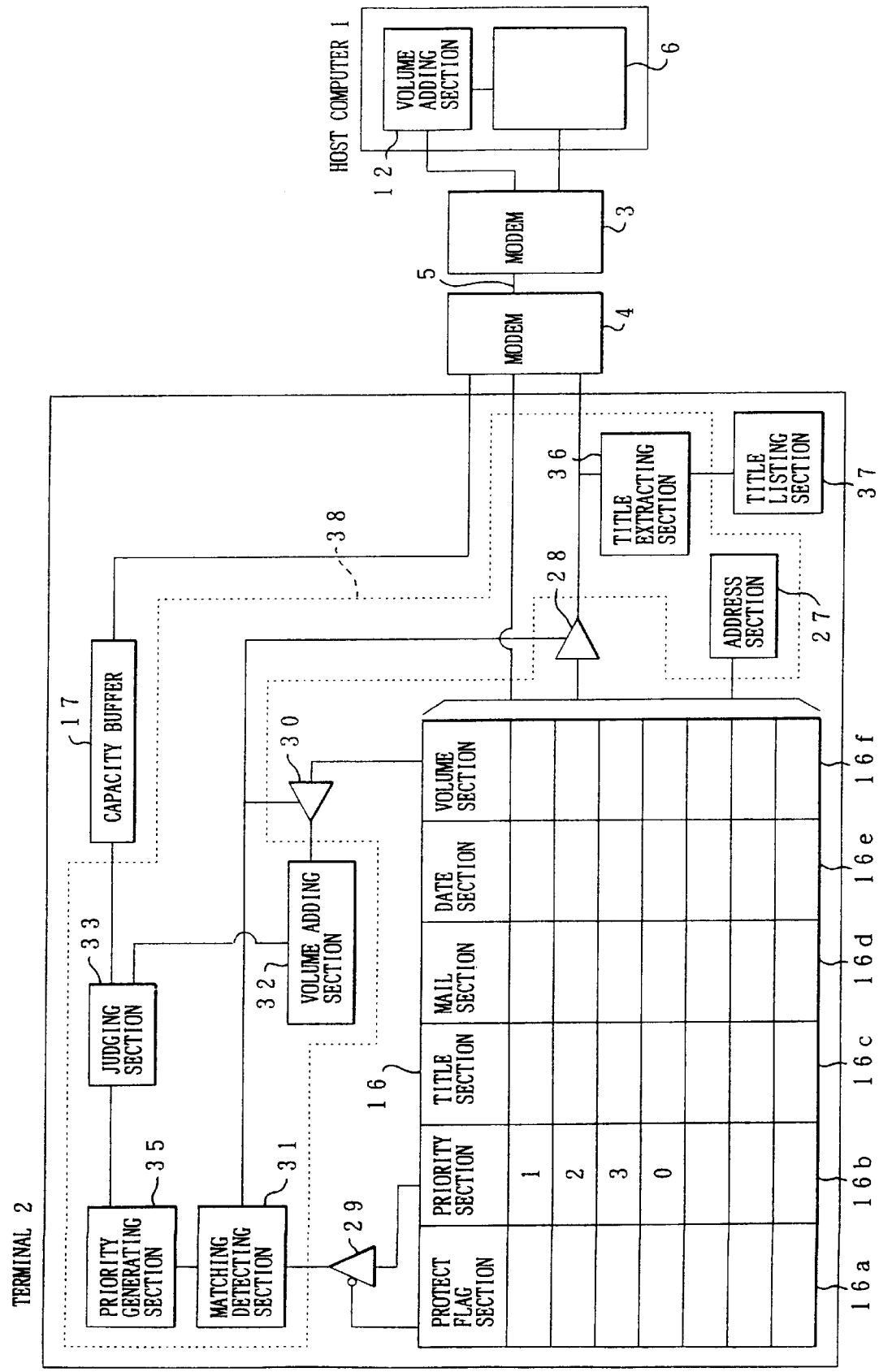
FIG. 3 is a view explaining in detail a terminal of the e-mail sending/receiving system in accordance with the above example embodiment.

As shown in FIG. 3, the terminal 2 is furnished with a storage section 16 serving as storage means for retaining the mails received from the host computer 1.

The storage section 16 is composed of a protect flag section 16a, a priority section 16b, a title section 16c, a mail section 16d, a date section 16e, and a volume section 16f for setting the mail information of each mail, such as the title and date. An address is allocated to each mail, and the mails are managed by and retrieved based on the addresses.

In the protect flag section 16a, a protect flag for inhibiting the mail from being saved to the host computer 1 is stored. Here, when the protect flag section 16a is set to "1", it means that the mail is not allowed to be saved to the host computer 1, and when the protect flag section is set to "0", it means that the mail can be saved to the host computer 1. In other words, "1" is set to the protect flag section 16a for the mail to which the prohibition of the saving is set, while "0" is set to the protect flag section 16a for the mail to which the prohibition of the saving is not set.

To save the mail(s) means to send back the mails having been stored in the terminal 2 to the host computer 1 when an available memory capacity of the terminal 2 is short, and this is done to secure a sufficient memory capacity in the terminal 2.

In the priority section 16b, the precedence obtained from the priorities assigned to each mail is stored. To be more specific, values "1", "2", "3", and "0" are set in order of descending priorities based on the precedence. Here, "null" data are stored in the priority section 16b for the area having stored no mail.

In the title section 16c, the title of each mail is stored, and a special code is set at the top of the mail to identify that the data therein represent the title.

In the mail section 16d, a brief content of the mail is stored, and the receipt date of the mail is stored in the date section 16e. In the volume section 16f, a value indicating a volume of the mail is stored.

The entire mail and other mail information are stored into an unillustrated storage area of the storage section 16.

The storage section 16 is connected to a control device (second control means) 38 through a first gate 28, a second gate 29, and a third gate 30. The storage section 16 is also connected to an address section 27 that forms the control device 38.

The control device 38 is composed of the address section 27, a matching detecting section 31, a volume adding section 32, a judging section 33, and a priority generating section 35.

The address section 27 sequentially retrieves the mails stored in the storage section 16 based on their respective addresses, and outputs the same to the first gate 28.

The output of the first gate 28 is connected to a second modem 4 of the terminal 2, so that the mail is sent to the host computer 1 from the terminal 2 when the first gate 28 is opened. The first gate 28 is opened by a gate opening command signal from the matching detecting section 31, which will be described below.

The input of the second gate 29 is connected to the priority section 16b of the storage section 16, while the output of the same is connected to the matching detecting section 31, which will be described below. Also, the second gate 29 receives an inverted protect flag from the protect flag section 16a of the storage section 16 as the gate opening command signal. In other words, the second gate 29 is opened based on the input protect flag, so that a signal (indicating the priority of the mail) from the priority section 16b of the storage section 16 is outputted to the matching detecting section 31. More specifically, in the present embodiment, a value "1" is set to the protect flag section 16a of a mail which is inhibited from being saved, and a value "0" is set to the protect flag section 16a of a savable mail. Thus, the second gate 29 is opened only for the savable mails.

The input of the third gate 30 is connected to the volume section 16f of the storage section 16, while the output of the same is connected to the volume adding section 32, which will be described below. The third gate 30 receives a signal from the matching detecting section 31 as the gate opening command signal.

The volume adding section 32 adds up volume values of the new mails inputted through the third gate 30 each time all the mails are retrieved. The third gate 30 is opened in response to a signal from the matching detecting section 31, which will be described below. The volume adding section 32 outputs the addition result of the volume values to the judging section 33 connected to its output. The final addition result means, of all the mails currently stored in the terminal 2, a total volume of the mails for which the protect flags are set to "0", in short, a total volume of the mails which can be saved to the host computer 1.

More specifically, of all the mails for which the protect flags are set to "0", the volume adding section 32 outputs a total volume of the mails, to which the matching detecting section 31 has outputted the gate opening command signal, to the judging section 33 as the addition result. Although it will be described in detail below, the matching detecting section 31 is arranged in such a manner to output the gate opening command signal only to the mails assigned with a particular priority each time all the mails are retrieved sequentially. Consequently, of all the savable mails to the host computer 1, volumes of those assigned with that particular priority alone are added up.

Besides the volume adding section 32, the judging section 33 is connected to a capacity buffer 17. The capacity buffer 17 retains the information as to the addition result from the volume adding section 12 of the host computer 1, which is sent to the terminal 2 through the second modem 4 and first modem 3 via the telephone line 5. This arrangement allows the judging section 33 to receive a sending volume of the host computer 1 stored in the capacity buffer 17.

The judging section 33 compares a volume of the mails to be sent from the host computer 1 which is stored in the capacity buffer 17 with the addition result of the volume adding section 32, and outputs the comparison result to the priority generating section 35.

More specifically, when the judging section 33 judges that a volume of the mails to be sent from the host computer 1 is greater than the addition result of the volume adding section 32, namely a total volume of the saved mails, the judging section 33 outputs a signal to the priority generating section 35. Upon receipt of the signal, the priority generating section 35 generates "3" as the next lowest priority to "0".

When the judging section 33 judges that a volume of the mails to be sent from the host computer 1 is smaller than the addition result of the volume adding section 32, namely, a total volume of the saved mails, it is not necessary to save the mails because a sufficient memory capacity is secured in the terminal 2. Thus, the terminal 2 receives the new mails from the host computer 1 and stores the same in a storage space in the storage section 16 of the terminal 2.

The priority generating section 35 generates the priorities, so that the mails are saved to the host computer 1 in order of ascending priorities based on the signal from the judging section 33, and outputs the priority information to the matching detecting section 31. More specifically, the priority generating section 35 generates a value "0" indicating the lowest priority followed by values "3", "2", and "1" based on the signal from the priority generating section 35 each time all the mails are retrieved.

The matching detecting section 31 outputs the gate opening command signal only when the priority of a mail for which the protect flag inputted through the second gate 29 exhibits "0", namely a savable mail, matches with the priority generated by the priority generating section 35. The first gate 28 and third gate 30 are opened based on the gate opening command signal outputted from the matching detecting section 31.

When the matching detecting section 31 outputs the gate opening command signal and the first gate 28 is opened, the mail being accessed by the address section 27 is sent to the host computer 1 through the second modem 4 and first modem 3 via the telephone line 5. At the same time, the mail is inputted to a title extracting section 36 provided in the terminal 2.

The title extracting section 36 extracts the title of the mail sent back to the host computer 1. More specifically, the title extracting section 36 extracts the title by detecting the special code set at the top of the title of each mail sent back to the host computer 1. Then, the title extracting section 36 outputs the titles thus extracted to a title listing section (list information storing means) 37 connected to the title extracting section 36.

Next, the operation of the above-arranged terminal 2 when receiving a new mail from the host computer 1 will be explained in the following.

The address section 27 sequentially accesses the mails stored in the storage section 16 of the terminal 2 as shown in FIG. 3, and when the address section 27 accesses a mail for which the protect flag is set to "0", the protect flag section 16a outputs a gate opening signal to the second gate 29, whereupon the second gate 29 is opened. On the other hand, when the address section 27 accesses a mail for which the protect flag is set to "1", the protect flag section 16a outputs a gate closing signal to the second gate 29, whereupon the second gate is closed.

Here, the second gate 29 receives the priorities of the mails from the priority section 16b. Thus, the second gate 29 is opened based on the signal from the protect flag section 16a. Consequently, only the priorities assigned to the mails for which protect flags exhibit "0" are sequentially outputted to the matching detecting section 31.

On the other hand, the priority generating section 35 generates the priorities in ascending order and outputs the same to the matching detecting section 31. Note that, in the example case of FIG. 3, the priority generating section 35 initially outputs a value "0" indicating the lowest priority, with which the matching is detected.

The matching detecting section 31 receives the priorities of the mails for which the protect flags exhibit "0" from the priority section 16b, and it outputs the gate opening command signal to both the first gate 28 and third gate 30 only when the priority of the mail matches with the priority generated by the priority generating section 35, whereby the first gate 28 and third gate 30 are opened.

When the first gate 28 is opened, the mail being accessed by the address section 27 is sent to the host computer 1 through the second modem 4. Here, the saved mail is erased from the storage section 16 of the terminal 2. Thus, a storage space for the new mails can be secured in the storage section 16 of the terminal 2 by saving the mails having been stored therein to the host computer 1.

The mails saved to the host computer 1 from the terminal 2 are also inputted into the title extracting section 36 provided somewhere between the first gate 28 and second modem 4. Here, the title of each saved mail is extracted by detecting the special code appended at the top thereof. The extracted titles are held in the title listing section 37 and displayed on an unillustrated display section or the like later. The mail information (list information of the mails) of the mails saved to the host computer 1 from the terminal 2 is held in the title listing section 37 of the terminal 2 in the above manner, whereby the user can readily confirm which mails have been saved to the host computer 1 from the terminal 2.

On the other hand, when the third gate 30 is opened, a volume of the mail being accessed by the address section 27 is outputted to the volume adding section 32. Consequently, of all the mails for which the protect flags exhibit "0", volumes of the mails whose priorities match with the priority set in the matching detecting section 31 are added up.

Thus, the volumes of the savable mails can be added up in order of ascending priorities by sequentially retrieving the mails while the priority set in the matching detecting section 31 is updated in order of ascending priorities.

To be more specific, the third gate 30 receives the content of the volume section 16f of the mail stored in the storage section 16 and being accessed by the address section 27, and it is opened for the mail whose priority is confirmed as matching with the priority set in the matching detecting section 31. Consequently, a volume of the mail assigned with the initial priority value of "0" is outputted to the volume adding section 32.

The volume adding section 32 adds up the volumes of the savable mails whose priorities exhibit "0" as the address section 27 sequentially retrieves the mails. In other words, the volume adding section 32 adds up the volumes of the mails saved to the host computer 1, and computes an available memory capacity of the storage section 16, after which the volume adding section 32 outputs the computation result (addition result) to the judging section 33.

The judging section 33 compares a total volume of the new mails to be sent from the host computer 1, which is held in the capacity buffer 17, with an available memory capacity of the storage section 16 computed by the volume adding section 32 of the terminal 2 by adding a capacity of the mails saved to the host computer 1.

When the judging section 33 judges that the former is greater than the latter, the terminal 2 starts to retrieve the mails further by means of the address section 27, and saves the savable mails whose priorities exhibit "0".

After all the savable mails assigned with "0" priority have been saved and all the mails have been retrieved, the judging section 33 outputs a signal to the priority generating section 35. Upon receipt of the signal from the judging section 33, the priority generating section 35 generates a value "3", which is the next lowest priority to "0", and outputs the same to the matching detecting section 31. Accordingly, the matching detecting section 31 updates the priority used for the matching detection to "3" from "0".

On the other hand, when the judging section 33 judges the former is smaller than the latter, it is not necessary to save the mails. Thus, the terminal 2 receives the mails from the host computer 1 and saves the same in a storage space of the storage section 16 thus secured.

According to the above process, each time all the mails are retrieved upon updating of the priority with which the matching detection is carried out, the terminal 2 saves the savable mails to the host computer 1 in order of ascending priorities until a capacity required to store the mails to be sent from the host computer 1 is secured in the storage section 16 of the terminal 2, so that the terminal 2 can receive the new mails.

Also, since the mail information of each saved mail is retained, the user can readily confirm which mails have been saved to the host computer 1.

Next, the operations of the host computer 1 and terminal 2 of the above-arranged e-mail sending/receiving system will be explained in the following.

Figure 4:
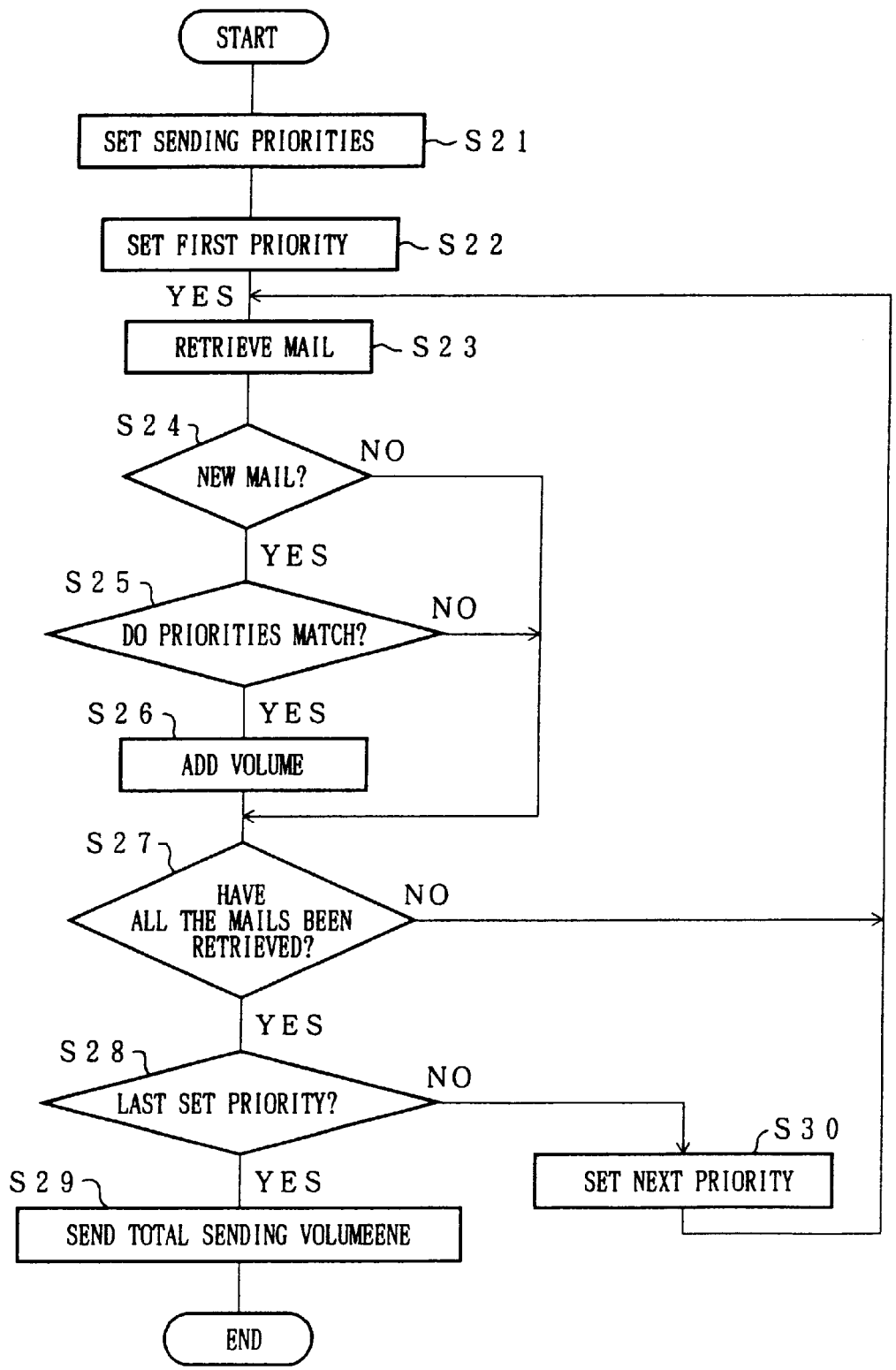
FIG. 4 is a flowchart detailing an operation procedure of the host computer in the e-mail sending/receiving system of FIG. 1.

In the first place, the operation of the host computer 1 will be explained with reference to the block diagram of FIG. 1 and the flowchart of FIG. 4. Here, assume that the internal arrangement of the host computer 1 used herein is identical with the internal arrangement of the host computer 1 of the first example except that the gate opening command signal is outputted to the third gate 10 from the matching detecting section 11 as is indicated by a signal line L2 (indicated by an alternate long and short dash line in the drawing) instead of being outputted from the new flag section 6a as is indicated by a signal line L1. The third gate 10 is opened only when the matching detecting section 11 judges that the priority of the mail matches with the priority set in the matching detecting section 11. Thus, of all the new mails, the volume adding section 12 adds up the volumes of the mails whose priorities match with the priority set in the matching detecting section 11.

To begin with, the priorities, in accordance with which the mails are sent to the terminal 2, are set (S21). Assume that only the mails assigned with priorities "1" and "2" will be sent herein.

Then, the priority generating section 15 generates the top priority and sets the same to the matching detecting section 11 as the priority to be compared with the priority of the mail (S22). Here, a value "1" is set as the top priority.

Subsequently, a mail held in the host computer 1 is retrieved by means of the address section 7 (S23).

Then, whether the new flag of the retrieved mail exhibit "1" or not is judged (S24). In other words, whether the mail retrieved in S23 is a new mail or not is judged based on the state of the new flag stored in the new flag section 6a. More specifically, the new flag of the retrieved mail is outputted to the second gate 9 from the new flag section 6a of the storage section 6 as the gate opening command signal, that is, the state of the new flag is reflected on the state of the second gate 9.

Here, when the new flag of the retrieved mail does not exhibit "1", that is, when the retrieved mail is not a new mail (NO), the flow skips to S27. On the other hand, when the new flag of the retrieved mail is set to "1", that is, when the retrieved mail is a new mail (YES), the flow proceeds to S25.

In S25, the matching detecting section 11 judges whether the currently set priority matches with the priority assigned to the new mail retrieved in S23. When the priorities do not match with each other in S25 (NO), the flow skips to S27; otherwise (YES) the mail is judged as the mail to be sent to the terminal 2 and the flow proceeds to S26.

In S26, a memory capacity required to send the mail judged as the mail to be sent to the terminal 2 is computed as the sending volume. More specifically, having detected the matching of the priorities, the matching detecting section 11 outputs the gate opening command signal and opens the third gate 10, whereby a volume of the retrieved mail is inputted to the volume adding section 12 from the volume section 6f and added up.

Then, whether all the mails stored in the host computer 1 have been retrieved or not is judged in S27. Here, when not all the mails have been retrieved (NO), the flow returns to S23 to retrieve the remaining mails. When all the mails have been retrieved (YES), it means that, of all the new mails, a total volume of the mails assigned with the set priority (herein, "1") is computed.

Subsequently, whether a total volume of the new mails to be sent to the terminal 2 for all the priorities set in S21 is computed or not is judged (S28). In other words, whether the priority currently set in the matching detecting section 11 has reached the lowest priority set in S21 is judged.

When it is judged that not all the priorities have been processed yet (NO), the flow skips to S30. More specifically, since "1" and "2" are set in S21 as the priorities assigned to the mails to be sent to the terminal 2, if the priority currently set in the matching detecting section 11 is "1", it is judged that not all the priorities have been processed, because there is the next highest priority "2".

In S30, the next priority is set in the matching detecting section 11. In other words, of all the priorities set in S21 as the priorities assigned to the mails to be sent, the priority generating section 15 generates the next highest priority to the currently set priority, whereby the matching detecting section 11 updates the priority set therein with the newly generated priority, with which the matching detection is carried out. Here, a value "2" is set in the matching detecting section 11 as the updated priority. Then, the flow returns to S23, and a mail is retrieved again.

On the other hand, when it is judged that all the set priorities have been processed (YES), the flow proceeds to S29. More specifically, since values "1" and "2" are set in S21 as the priorities assigned to the mails to be sent to the terminal 2, if the priority currently set in the matching detecting section 11 is "2", it is judged that all the priories have been processed, because there is no next highest priority.

In S29, a volume is sent. In other words, a total volume obtained by adding up the volumes of all the new mails to be sent to the terminal 2 from the host computer 1 by the volume adding section 12 is sent to the terminal 2.

Here, S24 and S25 are the actions taken by host computer's second internal control means and S21–S30 are the actions taken by host computer's sixth internal control means.

In the above operation, each judgment is carried out for each priority and the volumes of the mails are added up. However, if it is arranged to judge a plurality of priorities in S25, then S27 and S28 can be omitted, thereby simplifying the operation. In short, since all the priorities assigned to the mails to be sent to the terminal 2 can be judged in S25, the procedure can be simplified.

Figure 5:
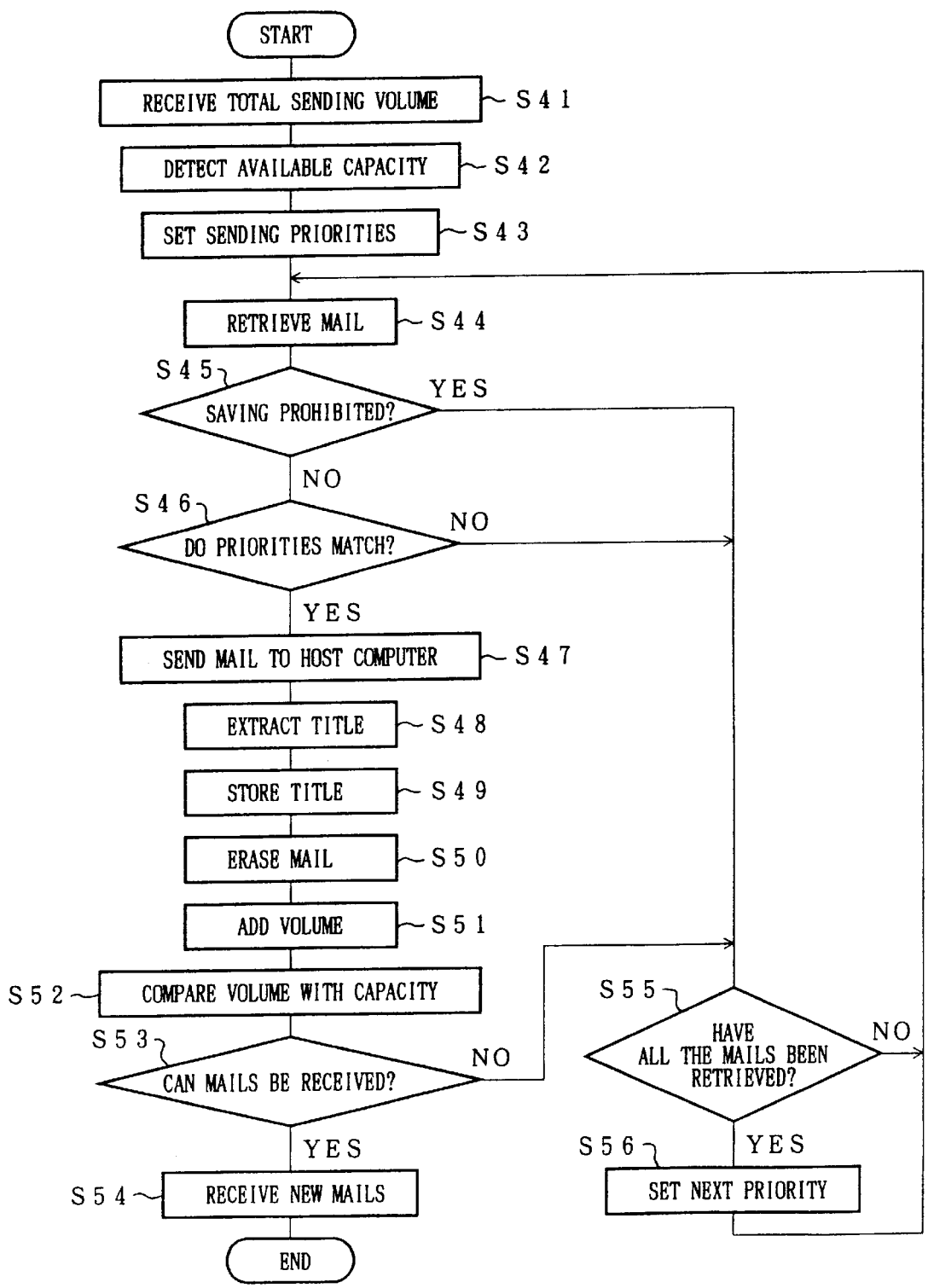
FIG. 5 is a flowchart detailing an operation procedure of the terminal in the e-mail sending/receiving system of FIG. 3.

Next, the operation of the terminal 2 will be explained with reference to the block diagram of FIG. 3 and the flowchart of FIG. 5. Here, assume that the terminal 2 does not have a sufficient available memory capacity for the coming mails.

To begin with, the terminal 2 receives a total volume of the mails to be sent from the host computer 1 (S41). More specifically, the sending volume computed by the volume adding section 12 of the host computer 1 and sent from the host computer 1 in S29 of FIG. 4 is stored in the capacity buffer 17 of the terminal 2.

Then, an available memory capacity of the storage section 16 of the terminal 2 is detected and stored in the volume adding section 32 as an initial value of the available memory capacity of the storage section 16 (S42).

Then, the priority is set (S43). More specifically, of all the priorities assigned to the mails stored in the storage section 16, the priority generating section 35 generates the lowest priority and outputs the same to the matching detecting section 31. Upon receipt of the lowest priority, the matching detecting section 31 sets the same as an initial value of the priority, with which the matching detection is carried out. Here, a value "0" representing the lowest priority is set followed by values "3", "2", and "1" in order of ascending priorities based on the precedence. Thus, the priority generating section 35 generates the lowest priority "0", and sets the same to the matching detecting section 31 as the initial priority value, with which the matching detection is carried out.

Subsequently, a mail held in the storage section 16 of the terminal 2 is retrieved (S44). More specifically, a mail held in the storage section 16 of the terminal 2 is retrieved by means of the address section 27.

Then, whether protect flag of the retrieved mail is set to "1" or not is judged (S45). In other words, whether the mail retrieved in S44 is a mail which is prohibited from being saved or not is judged based on the state of the protect flag stored in the protect flag section 16a. More specifically, the protect flag of the retrieved mail is outputted to the second gate 29 from the protect flag section 16a of the storage section 16 as the gate opening command signal. Thus, the state of the protect flag is reflected on the state of the second gate 29.

If the protect flag is set to "1" in S45 (YES), the flow skips to S55, because the saving of the mail is prohibited.

On the other hand, if the protect flag is not set to "1" in S45 (NO), whether the priorities match with each other or not is judged (S46), because the saving of the mail is allowed.

In S46, whether the currently set priority matches with the priority assigned to the retrieved mail in S44 is judged by the matching detecting section 31. Then, if the priorities do not match with each other (NO), the flow skips to S55.

When it is judged that the priorities match with each other in S46 (YES), the mail is sent to the host computer 1 to be saved therein (S47).

Subsequently, the mails judged as should be saved to the host computer 1 in S46 are sent and erased in the following manner. Also, the titles of these mails are extracted and stored in the following manner.

In S47, the retrieved mail is sent to the host computer 1. In other words, when it is judged that the priorities match with each other, the matching detecting section 31 outputs the gate opening command signal and the first gate 28 is opened, whereby the mail being accessed by the address section 27 is sent to the host computer 1.

Subsequently, the title of the mail to be sent to the host computer 1 is extracted (S48), and the extracted title is stored in the title listing section 37 of the terminal 2 (S49).

In other words, the mail to be sent to the host computer 1 is also inputted to the title extracting section 36 in S48. The title extracted by the title extracting section 36 is outputted to the title listing section 37.

In S49, the title of the mail extracted by the title extracting section 36 is stored in the title listing section 37. Thus, the user can confirm the mail information of the mails saved to the host computer 1 from the terminal 2 by checking a display of the content of the title listing section 37.

Then, the mail sent to the host computer 1 is erased from the storage section 16 of the terminal 2 (S50). Consequently, the mail is saved and a new storage space is secured in the storage section 16.

Then, an available memory capacity of the storage section 16 of the terminal 2 thus secured is added up to the current available memory capacity (S51), and the available memory capacity thus found is compared with a total volume of the mails which was received in S41 and will be sent from the host computer 1 (S52).

In other words, in S51, a volume of the mail judged as should be saved to the host computer 1 in S46 is added up to the available memory capacity of the storage section 16. More specifically, upon detecting the matching of the priorities, the matching detecting section 31 outputs the gate opening command signal and the third gate 30 is opened, whereby a volume of the mail being accessed by the address section 27 is added up by the volume adding section 32. Consequently, the volume of the mail judged as should be saved in S64 is added to the available memory capacity of the storage section 16.

In S52, the available memory capacity thus found is compared with a total volume of the new mails in the host computer 1. More specifically, the judging section 33 compares a total volume of the new mails in the host computer 1 retained in the capacity buffer 17 with the available memory capacity of the storage section 16 computed by the volume adding section 32 by adding up the volumes of the mails saved in the host computer 1.

Then, the terminal 2 judges whether all the mails to be sent from the host computer 1 can be received or not based on the result in S52 (S53). Here, when it is judged that all the new mails can be received (YES), the terminal 2 receives all the new mails from the host computer 1 (S54).

On the other hand, when it is judged that not all the mails to be sent from the host computer 1 can be received in S53 (NO), whether all the mails have been retrieved or not is judged (S55). Here, whether all the mails having the same priority are retrieved or not is judged. Then, when not all the mails have been retrieved yet (NO), the flow returns to S44 and the remaining mails are retrieved. On the other hand, when it is judged that all the mails have been retrieved in S55 (YES), the next priority is set (S56). Then, the flow returns to S44 and a mail is retrieved again.

In other words, in S55, whether there is any savable mail whose priority matches with the priority currently set in the matching detecting section 31 is judged. When not all the mails have been retrieved yet (NO), the flow proceeds to S44 and a mail is retrieved to save the savable mails assigned with the currently set priority. On the other hand, when all the mails have been retrieved in S55 (YES), the flow proceeds to S56, because there is no savable mail assigned with the currently set priority.

In S56, the next priority is set. Then, the flow returns to S44 and a mail is retrieved again. More specifically, when all the savable mails having the same priority as the one set in the matching detecting section 31 have been saved and all the mails have been retrieved, the judging section 33 outputs a signal to the priority generating section 35. Upon receipt of the signal from the judging section 33, the priority generating section 35 generates the priority next lowest to the one currently set in the matching detecting section 31, and outputs the same to the matching detecting section 31. Accordingly, the matching detecting section 31 updates the currently set priority with the newly generated priority. For example, if "0" is currently set in the matching detecting section 31, "0" is updated with "3".

In contrast, when the terminal 2 judges that it can receive all the mails to be sent from the host computer 1, it starts to receive the new mails from the host computer 1 (S54). In other words, when a total volume of the new mails in the host computer 1 is smaller than the available memory capacity of the storage section 16 of the terminal 2, no more mails has to be saved. Thus, the terminal 2 starts to receive the mails from the host computer 1, and stores the same in the storage space secured in the storage section 16.

Here, S47–S49 are the actions taken by terminal's first internal control means; S45 is the action taken by terminal's second internal control means; S47 is the action taken by host computer's fourth internal control means; and S50–S54 are the actions taken by host computer's fifth internal control means.

As has been explained, since the terminal 2 is arranged to save the mails stored in its storage section 16 in order of ascending priorities to the host computer 1 in response to a total volume of the mails to be sent from the host computer 1, the terminal 2 can receive all the new mails. Moreover, since the titles of the saved mails are left, the user can readily confirm which mails have been saved.

Programs to execute the jobs carried out in the above-arranged e-mail sending/receiving system are stored in a program medium as an information recording medium separable from the main body of the apparatus, such as a CD-ROM, a floppy disk, and an IC card.

Figure 6:
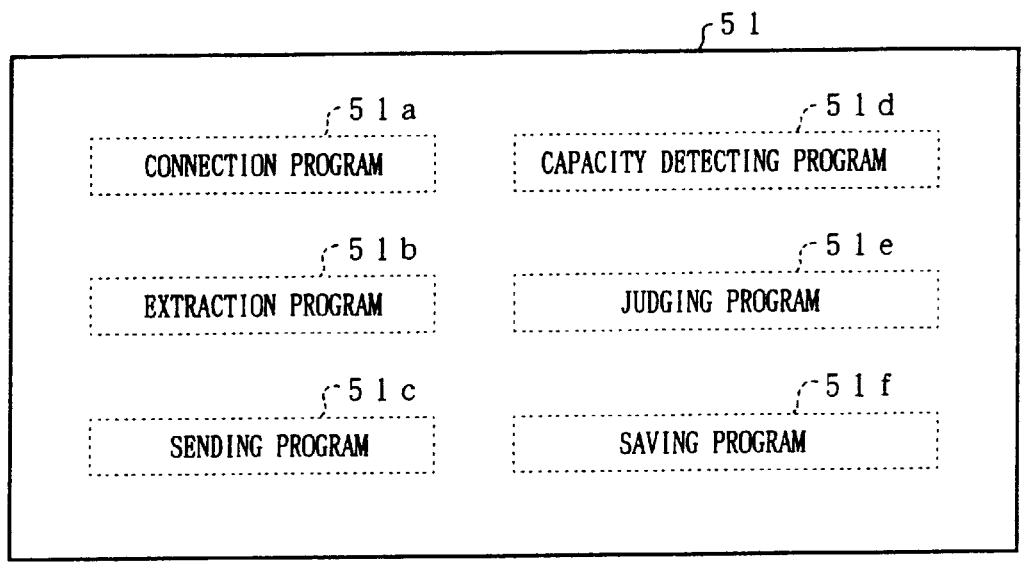
FIG. 6 is a view explaining a recording medium used for the e-mail sending/receiving system of FIGS. 1 and 3.

As shown in FIG. 6, a program medium 51 stores programs for carrying out the operations in the above-arranged e-mail sending/receiving system: a connection program 51a, an extraction program 51b, a sending program 51c, a capacity detecting program 51d, a judging program 51e, and a saving program 51f.

More precisely, the connection program 51a is a program for establishing a connection between the host computer 1 and terminal 2.

The extraction program 51b is a program for extracting mails in order of priorities assigned to the mails.

The sending program 51c is a program for sequentially sending the mails extracted by the extraction program 51b to the terminal 2 connected to the host computer 1.

The capacity detecting program 51d is a program for detecting an available memory capacity of the terminal 2.

The judging program 51e is a program for judging whether the mails can be stored into the storage section 16 of the terminal 2 whose available memory capacity is detected by the capacity detecting program 51d.

The saving program 51f is a program for selectively saving the storage content of the storage section 16 of the terminal 2 to the host computer 1.

As has been explained, the program medium 51 stores various kinds of programs to be stored in the host computer 1 and terminal 2. These various kinds of programs are stored in an unillustrated program storage area in one of the storage section 6 of the host computer 1 and the storage section 16 of the terminal 2, and retrieved and executed by the control device 18 or 38.

As has been explained, an e-mail sending/receiving system of the present invention is characterized in that a first control means compares a volume of mails to be sent from a host computer with an available memory capacity of a second storage section of a terminal where the mails sent from the host computer are stored, and consequently sends the mails to the second storage section up to its full memory capacity.

According to the above arrangement, when a volume of the mails to be sent form the host computer to the terminal exceeds a current available memory capacity of the second storage section of the terminal, that is, when it is judged that not all the mails to be sent to the terminal can be stored in the second storage section, the mails are stored in the second storage section in order of descending priorities to the user of the terminal up to the current available memory capacity of the second storage section.

Consequently, the user can read the mails in order of descending priorities to him only by reading the mails stored in the second storage section of the terminal in order of storage. In other words, the user can read the mails with higher priorities to the user, that is, urgent or important mails, with the precedence without searching such mails from all the received mails only by reading the mails stored in the second storage section in order of storage.

Moreover, even when the terminal does not have an available memory capacity sufficient to store all the coming mails, the user can receive the mails assigned with higher priorities only if the available memory capacity is large enough to store these mails assigned with higher priorities. Consequently, the user does not have to manage the system each time the user receives the mail(s), thereby making the system management easier.

There can be also provided an e-mail sending/receiving method suitably used for the above-arranged e-mail sending/receiving system and a recording medium having thereon recorded the method.

More specifically, as has been explained, an e-mail sending/receiving method of the present invention is characterized by comprising:

a first step of comparing a volume of mails to be sent from a host computer with an available memory capacity of a second storage section of a terminal where the mails sent from the host computer are stored; and a second step of sending the mails to the terminal up to a full memory capacity of the second storage section.

Also, as has been explained, a recording medium of the present invention which can be read by a computer is characterized by having recorded thereon:

a first step of comparing a volume of mails to be sent from a host computer with an available memory capacity of a second storage section of a terminal where the mails sent from the host computer are stored; and a second step of sending the mails to the terminal up to a full memory capacity of the second storage section.

As has been explained, the e-mail sending/receiving system of the present invention may be arranged in such a manner that the terminal includes:

a second storage section for storing the mails sent from the host computer; and second control means for comparing a volume of the mails to be sent from the host computer with an available memory capacity of the second storage section, and when it turns out that the available memory capacity is short, for sending back the mails having been stored in the second storage section to the host computer in a volume corresponding to a shortage of the available memory capacity, and subsequently erasing the mails sent back to the host computer from the second storage section, and that the host computer stores the mails sent back from the terminal in the first storage section.

According to the above arrangement, even when the available memory capacity of the second storage section of the terminal is smaller than a volume of the mails stored in the first storage section of the host computer to be sent to the terminal, new mails can be stored in the second storage section. Thus, the user can receive the mails without worrying about the available memory capacity of the second storage section.

Also, there can be provided an e-mail sending/receiving method suitably used for the above e-mail sending/receiving system and a recording medium having thereon recorded the method.

That is, an e-mail sending/receiving method of the present invention is characterized by comprising:

a first step of comparing a volume of the mails to be sent from the host computer with an available memory capacity of a second storage section of the terminal where the mails sent from the host computer are stored;

a second step of, when it turns out that the available memory capacity is short, extracting the mails having been stored in the second storage section in a volume corresponding to a shortage of the available memory capacity in accordance with the priorities assigned to the mails;

a third step of sending back the mails extracted in the second step to the host computer to be stored in the first storage section; and a fourth step of erasing the mails sent back and stored in the first storage section in the third step from the second storage section.

Also, the recording medium of the present invention is characterized by having recorded thereon:

a first step of comparing a volume of the mails to be sent from the host computer with an available memory capacity of a second storage section of the terminal where the mails sent from the host computer are stored;

a second step of, when it turns out that the available memory capacity is short, extracting the mails having been stored in the second storage section in a volume corresponding to a shortage in accordance with the priorities assigned to the mails;

a third step of sending back the mails extracted in the second step to the host computer to be stored in the first storage section; and a fourth step of erasing the mails sent back and stored in the first storage section in the third step from the second storage section.

Also, as has been explained, the e-mail sending/receiving system of the present invention may be arranged in such a manner that the second control means extracts list information from the mails which will be sent back to the host computer and subsequently erased from the second storage section, and consequently stores the list information into list information storing means.

According to the above arrangement, since the list of the saved mail is created and displayed, the user of the terminal can readily confirm which mails have been saved by checking the list. In other words, the user can readily manage the mails.

Accordingly, the above e-mail sending/receiving method and the recording medium having thereon recorded the method may be arranged in the following manner.

That is, the e-mail sending/receiving method of the present invention may be arranged in such a manner to further comprise:

a fifth step of extracting list information from the mails which will be sent back to the host computer and subsequently erased from the second storage section; and a sixth step of storing the list information extracted.

Also, the recording medium of the present invention may be arranged in such a manner further to have recorded thereon:

a fifth step of extracting list information of the mails which will be sent back to the host computer and subsequently erased from the second storage section; and a sixth step of storing the list information extracted.

As has been explained, the e-mail sending/receiving system of the present invention may be arranged in such a manner that the first control means extracts the mails assigned with the priorities at or above a particular level as the mails to be sent from the host computer to the terminal.

According to the above arrangement, when the available memory capacity of the second storage section of the terminal is smaller than a volume of the mails stored in the first storage section of the host computer, the mails having stored in the second storage section are saved in a volume necessary to store the mails assigned with the priorities at or above a particular level of all the priorities assigned to all the mails stored in the first storage section of the host computer. Thus, a volume of the mails saved from the second storage section can be minimized. Consequently, a memory capacity of the second storage section can be utilized efficiently.

Accordingly, the above e-mail sending/receiving method and the recording medium having thereon recorded the method may be arranged in the following manner.

That is, the e-mail sending/receiving method of the present invention may be arranged in such a manner that the first step includes a sub-step of extracting the mails assigned with the priorities at or above a particular level as the mails to be sent from the host computer to the terminal.

Also, the recording medium of the present invention may be arranged to have recorded, in the first step, a sub-step of extracting the mails assigned with the priorities at or above a particular level as the mails to be sent from the host computer to the terminal.

Furthermore, as has been explained, the e-mail sending/receiving system of the present invention may be arranged in such a manner that the second control means extracts the mails which will be sent back to the host computer and subsequently erased from the mails to which saving is allowed.

According to the above arrangement, since the means for prohibiting the saving of particular mails among those stored in the second storage section to the first storage section is provided, even when the available memory capacity of the second storage section of the terminal is smaller than the volume of the mails stored in the first storage section of the host computer, particular mails, for example, mails the user wishes to see immediately or important mails, are not saved to the first storage section from the second storage section.

Consequently, the possibility of saving the mails the user has to read immediately can be eliminated, thereby eliminating a troublesome job, such as manipulation for searching the necessary mails from the host computer and restoring the same in the terminal.

Accordingly, the above e-mail sending/receiving method and the recording medium having thereon recorded the method may be arranged in the following manner.

That is, the e-mail sending/receiving method of the present invention may be arranged in such a manner that the second step includes a sub-step of extracting the mails which will be sent back to the host computer and subsequently erased from the second storage section from the mails to which saving is allowed.

Also, the recording medium of the present invention may be arranged to have recorded, in the second step, a sub-step of extracting the mails which will be sent back to the host computer and subsequently erased from the second storage section from the mails to which saving is allowed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An e-mail sending/receiving system comprising a terminal and a host computer, said host computer including:
   a first storage section for storing mails; and
   first control means for extracting mails to be sent to said terminal in accordance with priorities assigned to the mails, and
   said terminal including:
      a second storage section for storing the mails sent from said host computer; and
      second control means for comparing a volume of the mails to be sent from said host computer with an available memory capacity of said second storage section, and when it turns out that the available memory capacity is short, for sending back the mails having been stored in said second storage section to said host computer in a volume corresponding to a shortage of the available memory capacity, and subsequently erasing said mails sent back to said host computer from said second storage section, and
   wherein said host computer includes internal control means for storing said mails sent back from said terminal in said first storage section.

2. The e-mail sending/receiving system of claim 1, wherein said terminal includes list information storing means for storing list information of the mails to be sent back to said host computer and subsequently erased from said second storage section.

3. The e-mail sending/receiving system of claim 2, wherein said second control means includes internal control means for extracting the list information from the mails to be sent back to said host computer and subsequently erased from said second storage section, and consequently storing the list information extracted into said list information storing means.

4. The e-mail sending/receiving system of claim 1, wherein said terminal is connected to said host computer through a communication line when receiving the mails.

5. The e-mail sending/receiving system of claim 1, wherein said first control means includes internal control means for sequentially sending the extracted mails to said terminal.

6. The e-mail sending/receiving system of claim 1, wherein said first control means includes internal control means for extracting the mails to be sent to said terminal in accordance with the priorities and whether a user of said terminal has confirmed the mails or not.

7. The e-mail sending/receiving system of claim 1, wherein
   when it turns out that the available memory capacity is sufficient, said first control means consequently sends the mails to said terminal.

8. The e-mail sending/receiving system of claim 1, wherein said first control means includes internal control means for, after said mails sent back to said host computer have been erased from said second storage section, sending the mails stored in said first storage section to said terminal.

9. The e-mail sending/receiving system of claim 1, wherein said second control means includes a judging section for judging a relation in size between the volume of the mails received from said host computer and the available memory capacity of said second storage section, and consequently determining whether to receive the mails from said host computer or to erase the mails having been stored in said second storage section in accordance with the priorities based on the judged relation in size.

10. The e-mail sending/receiving system of claim 1, wherein said first control means includes internal control means for extracting the mails assigned with the priorities at or above a particular level as the mails to be sent from said host computer to said terminal.

11. The e-mail sending/receiving system of claim 1, wherein said second control means includes internal control means for extracting the mails to be sent back to said host computer and subsequently erased among mails to which saving is allowed.

12. An e-mail sending/receiving method comprising:
   extracting mails having been stored in a first storage section of a host computer in accordance with priorities assigned to the mails;
   comparing a volume of the mails to be sent from said host computer with an available memory capacity of a second storage section of a terminal where mails sent from said host computer are stored;
   when it turns out that the available memory capacity is short, extracting the mails having been stored in said second storage section in a volume corresponding to a shortage of the available memory capacity in accordance with the priorities;
   sending back the mails extracted from said second storage section to said host computer to be stored in said first storage section;
   erasing the mails sent back and stored in said first storage section from said second storage section; and
   sending the mails extracted from said first storage section to said terminal.

13. The e-mail sending/receiving method of claim 12, further comprising:
   sending the mails to said terminal when it turns out that sufficient memory capacity of said second storage section is available.

14. The e-mail sending/receiving method of claim 12, further comprising:
   extracting list information from the mails to be sent back to said host computer and subsequently erased from said second storage section; and
   storing the extracted list information in list information storing means provided in said terminal.

15. The e-mail sending/receiving method of claim 12, wherein said step of extracting mails from said first storage section includes a sub-step of extracting the mails assigned with the priorities at or above a particular level as the mails to be sent from said host computer to said terminal.

16. The e-mail sending/receiving method of claim 12, wherein said step of extracting the mails from said second storage section includes a sub-step of extracting the mails to be sent back to said host computer and subsequently erased from said second storage section from mails to which saving is allowed.

17. A computer-readable recording medium having recorded thereon a program that can be used to direct a computer to perform:
   process of extracting mails stored in a first storage section of a host computer in accordance with priorities assigned to the mails;
   a process of sending the mails extracted from said first storage section to a terminal;

a process of comparing a volume of the mails to be sent from said host computer with an available memory capacity of a second storage section of said terminal where the mails sent from said host computer are stored;

a process of, when it turns out that the available memory capacity is short, extracting the mails having been stored in said second storage section in a volume corresponding to a shortage in accordance with the priorities;

a process of sending back the mails extracted from said second storage section to said host computer to be stored in said first storage section; and a process of erasing the mails sent back to said host computer and stored in said first storage section from said second storage section.

18. The computer-readable recording medium of claim 17, wherein said program can be used to direct the computer to further perform:

a process of, when sufficient memory capacity of said second storage section is available, sending the mails to said terminal using said sending process.

19. The computer-readable recording medium of claim 17, wherein said program can be used to direct the computer to further perform:

a process of extracting list information of the mails to be sent back to said host computer and subsequently erased from said second storage section; and a process of storing the extracted list information into list information storage means provided in said terminal.

20. The computer-readable recording medium of claim 17, wherein said program can be used to direct the computer, in said process of extracting mails from said first storage section, to extract the mails having the priorities at or above a particular level as the mails to be sent from said host computer to said terminal.

21. The computer-readable recording medium of claim 17, wherein said program can be used to direct the computer, in said process of extracting the mails from said second storage section, to extract the mails to be sent back to said host computer and subsequently erased from mails to which saving is allowed.

22. A terminal for use with a host computer of an electronic mail system, comprising:

a terminal memory for storing electronic mail messages; and a terminal control section configured to compare a volume of electronic mail messages to be sent from said host computer with an available space in said terminal memory and, if the available space in said terminal memory is less than the volume of electronic mail messages to be sent, to send to said host computer for storage, in a volume corresponding to the shortage of available memory space, selected electronic mail messages currently stored in said terminal memory and to then erase the sent electronic mail messages from said terminal memory.

23. The terminal of claim 22, wherein priorities are associated with the electronic mail messages stored in said terminal memory and said terminal control section selects electronic mail messages for sending to said host computer in accordance with the priorities.

24. The terminal of claim 23, wherein said terminal control section selects electronic mail messages for sending to said host computer beginning with the electronic mail messages having the lowest priority.

25. The terminal of claim 22, wherein the selected messages are sent to said host computer via a wireless communication link.

26. The terminal of claim 22, wherein the selected messages are sent to said host computer via a wired communication link.

27. The terminal of claim 22, wherein protect flags are associated with the electronic mail messages stored in said terminal memory and said terminal control section selects for sending to said host computer for storage only ones of the electronic mail messages for which the associated protect flag has a predetermined value.

28. The terminal of claim 22, further comprising:

a title listing memory, wherein said terminal control section extracts titles of the electronic mail messages sent to said host computer for storage and stores the extracted titles in said title listing memory.

29. A method of operating a terminal for use with a host computer of an electronic mail system, the method comprising the steps of:

comparing a volume of electronic mail messages to be sent from said host computer to said terminal with an available space in a memory of said terminal;

if the available space in the memory of said terminal is less than the volume of electronic mail messages to be sent, sending to said host computer for storage, in a volume corresponding to the shortage of available memory space, selected electronic mail messages currently stored in the memory of said terminal and then erasing the sent electronic mail messages from the memory of said terminal; and storing electronic mail messages sent from said host computer in the memory of said terminal.

30. The method of claim 29, further comprising:

associating priorities with the electronic mail messages stored in the memory of said terminal, wherein electronic mail messages for sending to said host computer are selected in accordance with the priorities.

31. The method of claim 30, wherein electronic mail messages for sending to said host computer are selected beginning with electronic mail messages having the lowest priority.

32. The method of claim 29, wherein the selected electronic mail messages are sent to said host computer via a wireless communication link.

33. The method of claim 29, wherein the selected electronic mail messages are sent to said host computer via a wired communication link.

34. The method of claim 29, further comprising:

associating protect flags with the electronic mail messages stored in the memory of said terminal, wherein only ones of the electronic mail messages for which the associated protect flag has a predetermined value are selected for sending to said host computer for storage.

35. The method of claim 29, further comprising:

extracting titles of the electronic mail messages sent to said host computer; and storing the extracted titles in a title listing memory of said terminal.

36. A computer-readable medium having computer-executable instructions for performing the steps recited in claim 29.

37. An electronic mail system comprising a host computer and a terminal, said host computer including:

a host memory for storing electronic mail messages; and a host control section configured to extract electronic mail messages from said host memory for sending via a communication link to said terminal, and said terminal including:
- a terminal memory for storing electronic mail messages; and
- a terminal control section configured to compare a volume of electronic mail messages to be sent from said host computer with an available space in said terminal memory and, if the available space in said terminal memory is less than the volume of electronic mail messages to be sent, to send selected electronic mail messages currently stored in said terminal memory to said host computer for storage in said host memory and to then erase the sent electronic mail messages from said terminal memory.

38. The electronic mail system of claim 37, wherein priorities are associated with the electronic mail messages stored in said host memory and said host control section extracts electronic mail messages from said host memory in accordance with the priorities.

39. The electronic mail system of claim 38, wherein said host control section extracts electronic mail messages from said host computer beginning with electronic mail messages having the highest priority.

40. The electronic mail system of claim 37, wherein priorities are associated with the electronic mail messages stored in said terminal memory and said terminal control section selects electronic mail messages for sending to said host computer in accordance with the priorities.

41. The electronic mail system of claim 40, wherein said terminal control section selects electronic mail messages for sending to said host computer beginning with electronic mail messages having the lowest priority.

42. The electronic mail system of claim 37, wherein protect flags are associated with the electronic mail messages stored in said terminal memory and said terminal control section selects only ones of the electronic mail messages for which the associated protect flag has a predetermined value for sending to said host computer for storage in said host memory.

43. The electronic mail system of claim 37, further comprising:
- a title listing memory, wherein
- said terminal control section extracts titles of the electronic mail messages sent to said host computer for storage in said host memory and stores the extracted titles in said title listing memory.

44. A method of sending and receiving e-mail in an electronic mail system comprising a host computer and a terminal, the method comprising the steps of:

storing electronic mail messages in a memory of said host computer;

extracting electronic mail messages from the memory of said host computer for sending via a communication link to said terminal;

comparing at said terminal a volume of electronic mail messages to be sent from said host computer with an available space in a memory of said terminal;

if the available space in the memory of said terminal is less than the volume of electronic mail messages to be sent, sending selected electronic mail messages currently stored in the memory of said terminal to said host computer and then erasing the sent electronic mail messages from the memory of said terminal;

storing the electronic mail messages sent from said terminal in the memory of said host computer; and sending the electronic mail messages extracted from the memory of said host computer to said terminal.

45. The method of claim 44, further comprising:

associating priorities with the electronic mail messages stored in the memory of said host computer, wherein the electronic mail messages stored in the memory of said host computer are extracted in accordance with the priorities.

46. The method of claim 45, wherein the electronic mail messages stored in the memory of said host computer are extracted beginning with electronic mail messages having the highest priority.

47. The method of claim 44, further comprising:

associating priorities with the electronic mail messages stored in said terminal memory, wherein electronic mail messages for sending to said host computer are selected in accordance with the priorities.

48. The method of claim 47, wherein the electronic mail messages for sending to said host computer are selected beginning with electronic mail messages having the lowest priority.

49. The method of claim 44, further comprising:

associating protect flags with the electronic mail messages stored in the memory of said terminal, wherein only ones of the electronic mail messages for which the associated protect flag has a predetermined value are selected for sending to said host computer for storage in said host memory.

50. The method of claim 44, further comprising:

extracting titles of the electronic mail messages sent to said host computer; and storing the extracted titles in a title listing memory of said terminal.

* * * * *